United States Patent [19]

Nagaoka et al.

[11] Patent Number: 5,395,565
[45] Date of Patent: Mar. 7, 1995

[54] METHOD OF DECIDING THE QUALITY OF RESIN WORKPIECE IN A COMPRESSION-MOLDING PROCESS

[75] Inventors: Tsutomu Nagaoka; Masahiko Kashiwa, both of Kobe, Japan

[73] Assignee: Kabushiki Kaisha Kobe Seiko Sho, Kobe, Japan

[21] Appl. No.: 953,823

[22] Filed: Sep. 30, 1992

[30] Foreign Application Priority Data

Oct. 1, 1991 [JP] Japan .................................. 3-253880

[51] Int. Cl.$^6$ ............................................. B29C 43/58
[52] U.S. Cl. ................................. 264/40.5; 264/40.1; 264/320
[58] Field of Search ............... 264/40.1, 40.5, 40.7, 264/328.1, 320

[56] References Cited

U.S. PATENT DOCUMENTS

| 4,911,629 | 3/1990 | Fujita ............................ 264/40.1 |
| 5,017,315 | 5/1991 | Kumazaki ................. 264/40.1 |

FOREIGN PATENT DOCUMENTS

| 0320914 | 6/1989 | European Pat. Off. . |
| 4233079 | 4/1993 | Germany ................. 264/40.1 |

Primary Examiner—Mathieu D. Vargot
Attorney, Agent, or Firm—Oblon, Spivak, McClelland, Maier, Neustadt

[57] ABSTRACT

A method of deciding the quality of a SMC workpiece (34) in compression-molding the SMC workpiece (34) on a compression-molding press which compression-molds the SMC workpiece (34) in a cavity (13) formed between a pair of molds (11, 12) by moving at least one of the pair of molds by hydraulic cylinder actuators (4, 7) includes detecting the hydraulic pressure $P_O$ of the working fluid supplied to the hydraulic cylinder actuators (4, 7) upon the arrival of the moving mold (11) at a predetermined position; comparing the detected hydraulic pressure $P_O$ with a predetermined optimum hydraulic pressure $P_N$ to determine the deviation $\Delta P_O = P_N - P_O$; deciding the quality of the SMC workpiece (34) on the basis of the deviation $\Delta P_O$, and interrupting the compression-molding /peration to avoid producing defective moldings when it is decided that the quality of the SMC workpiece is nonconforming or executing an automatic control operation to add a predetermined pressure correction $\Delta P$ corresponding to the deviation $\Delta P_O$ to the detected hydraulic pressure $P_O$.

11 Claims, 2 Drawing Sheets

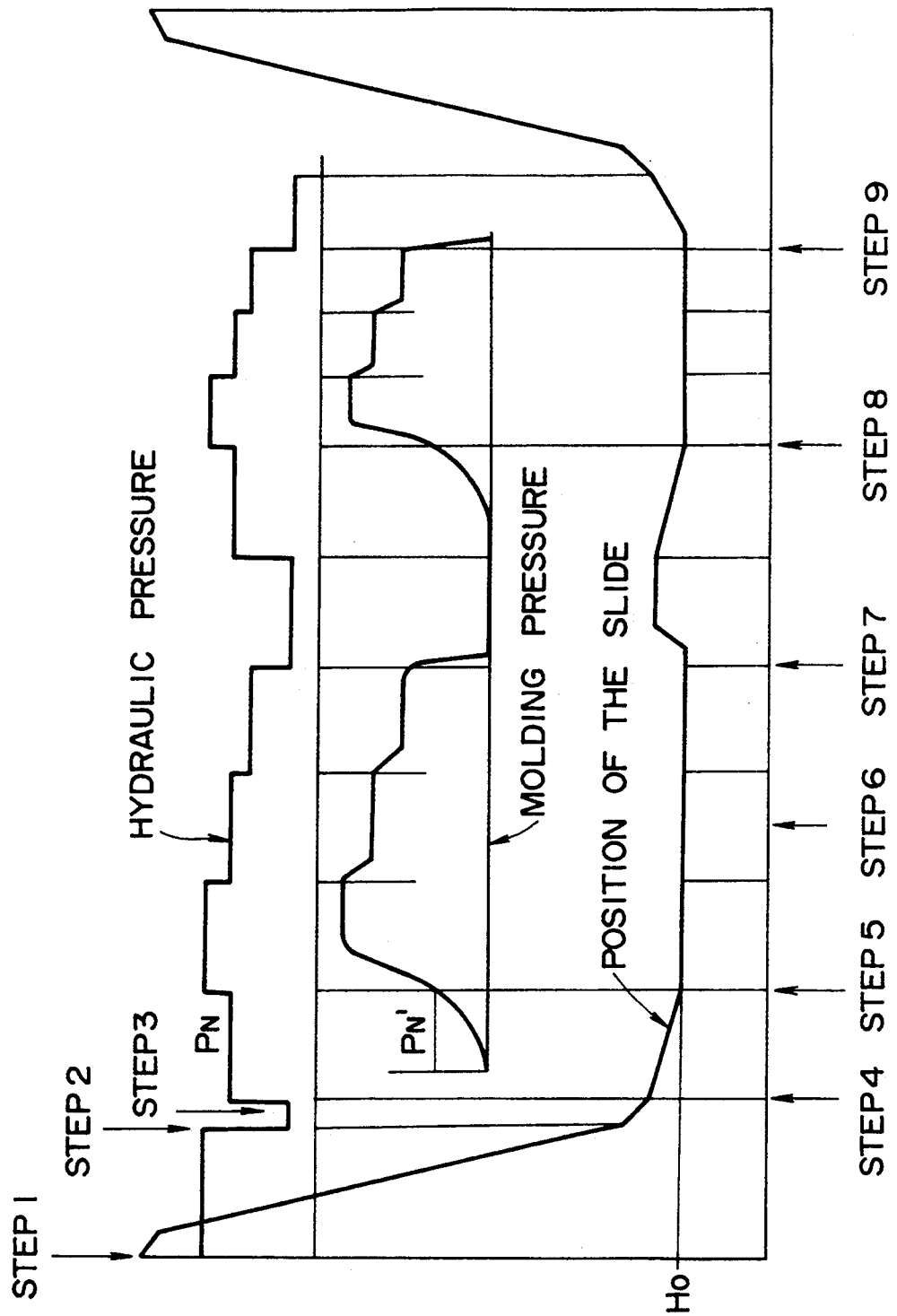

METHOD OF DECIDING THE QUALITY OF RESIN WORKPIECE IN A COMPRESSION-MOLDING PROCESS

BACKGROUND OF THE INVENTION

1. Field of the Invention

The present invention relates to a method of deciding the quality of a resin workpiece in a compression-molding process and to a method of controlling the pressure of the working fluid on a compression-molding press.

2. Description of the Prior Art

The front panel, body panel and the like of automobiles are formed by compression-molding a SMC (sheet molding compound) by a press. The SMC is a composite material consisting of base materials including a thermosetting unsaturated polyester resin, a filler, such as talc, and glass fibers, and additives including a hardening agent and a thickener, such as magnesium oxide. The SMC is supplied in sheets or blocks.

In compression-molding a SMC workpiece, such as a sheet or a block of a SMC, on a compression-molding press, the SMC workpiece is placed on a lower mold fixed on the bed of the compression-molding press, an upper mold is lowered by a hydraulic cylinder actuator to press the SMC workpiece between the upper mold and the lower mold to form the SMC workpiece in a desired shape by thermosetting.

Since the SMC is a composite material consisting of the foregoing materials, the quality of the SMC differs with each lot. The characteristics of the SMC will vary with the additive content thereof and the viscosity of the SMC varies with time after the addition of the thickener to the SMC. Since the quality and fluidity of the SMC differs with each lot, it is possible that chips are formed in the molding due to the unsatisfactory flow of the SMC or flashes are formed due to excessive charging if molding conditions for compression-molding are fixed.

Various molding methods have been proposed to solve such problems. In compression-molding a resin in a cavity formed between upper and lower molds by a prior art compression-molding method, the hydraulic cylinder actuator of a hydraulic press is controlled in a speed control mode to control the pressing speed of the hydraulic cylinder actuator until pressure starts acting on the resin, the hydraulic cylinder actuator is controlled in a pressure control mode to control the pressing force of the hydraulic cylinder actuator after pressure has started acting on the resin, and the timing of changing the control mode from the speed control mode into the pressure control mode is controlled to solve the foregoing problems.

A compression-molding method disclosed in Japanese Patent Laid-open (Kokai) No. Hei 1-192500 detects the speed of the slide and controls the timing of changing the control mode on the basis of the speed of the slide. Compression molding methods disclosed in Japanese Patent Laid-open (Kokai) Nos. Hei 1-266996 and Hei 1-156018 detect the pressure in the cavity and controls the timing of changing the control mode on the basis of the pressure in the cavity. A compression-molding method disclosed in Japanese Patent Laid-open (Kokai) No. Hei 1-156019 detects the pressure in the pressure chamber of a hydraulic cylinder actuator and controls the timing of changing the control mode on the basis of the pressure in the pressure chamber of the hydraulic cylinder actuator. A compression-molding method disclosed in Japanese Patent Laid-open (Kokai) No. Hei 1-156023 detects the position of the slide and controls the timing of changing the control mode on the basis of the position of the slide.

These prior art compression-molding methods are effective when the difference in the contents of the components of the SMC between lots and the difference in the viscosity of the SMC between lots are relatively small and the charging rate varies slightly in the pressing speed control range. However, these prior art compression-molding methods are unable to deal with compression-molding a SMC having a very high viscosity or the quality of the SMC differs greatly with each lot, so that many nonconforming moldings are produced.

SUMMARY OF THE INVENTION

Accordingly, it is an object of the present invention to avoid producing defective moldings by deciding the quality of a SMC to decide if the SMC is suitable for use and to produce conforming moldings by automatically correcting molding conditions and controlling pressing for optimum molding conditions when the quality of the SMC is within an acceptable range.

In a first aspect of the present invention, a method of deciding the quality of a resin workpiece in compression-molding the resin workpiece on a compression-molding press which compression-molds the resin workpiece in a cavity formed between a pair of molds by moving at least one of the pair of molds by hydraulic cylinder actuators, comprises steps of: detecting a value of a press characteristic indicative of workpiece quality upon the arrival of the moving mold at a predetermined position corresponding to a time during which the resin workpiece is spread to fill the cavity; comparing the detected value with a predetermined optimum value when the moving mold is at the predetermined position, to determine a deviation therebetween and deciding the quality of the resin workpiece on the basis of the deviation.

In a second aspect of the present invention, a method of deciding the quality of a resin workpiece in compression-molding the resin workpiece on a compression molding press which compression-molds the resin workpiece in a cavity formed between a pair of molds by moving at least one of the pair of molds by hydraulic cylinder actuators comprises steps of: detecting the molding pressure $P_O'$ in the cavity upon the arrival of the moving mold at a predetermined position; comparing the detected molding pressure $P_O'$ with a predetermined optimum molding pressure $P_N'$ to prevail within the cavity when the moving mold is at the predetermined position, to determine the deviation $\Delta P_O' = P_N' - P_O'$ and deciding the quality of the resin workpiece on the basis of the deviation $\Delta P_O'$.

In a third aspect of the present invention, a method of deciding the quality of a resin workpiece in compression-molding the resin workpiece on a compression-molding press which compression-molds the resin workpiece in a cavity formed between a pair of molds by moving at least one /f the pair of molds by hydraulic cylinder actuators comprises steps of: detecting the moving speed $V_O$ of the moving mold when the moving mold passes a predetermined position; comparing the detected moving speed $V_O$ with a predetermined optimum moving speed $V_N$ at which the moving mold is to move past the predetermined position, to determine the deviation $\Delta V_O = V_N - V_O$; and deciding the quality of the resin workpiece on the basis of the deviation $\Delta V_O$.

In a fourth aspect of the present invention, in the method in the third aspect of the present invention, the thickness of the resin workpiece put in the cavity is reduced to half the initial thickness thereof when the moving mold is at the predetermined position.

In a fifth aspect of the present invention, a method of deciding the quality of a resin workpiece in compression-molding the resin workpiece on a compression-molding press which compression-molds the resin workpiece in a cavity formed between a pair of molds by moving at least one of the pair of molds by hydraulic cylinder actuators comprises steps of: detecting a time $T_O$ between the time when the moving mold passes a predetermined first position and the time when the moving mold passes a predetermined second position; comparing the detected time $T_O$ with an optimum time $T_N$ in which the moving mold is to move from the predetermined first position to the predetermined second position, to determine the deviation $\Delta T_0 = T_N - T_O$; and deciding the quality of the resin workpiece on the bases of the deviation $\Delta T_0$.

In a sixth aspect of the present invention, a method of controlling a compression-molding press in compression-molding a resin workpiece on the compression-molding press which compression-molds the resin workpiece in a cavity formed between a pair of molds by moving at least one of the pair of molds by the hydraulic cylinder actuators comprises steps of: detecting a value of a press characteristic indicative of workpiece quality when the moving mold passes a predetermined position corresponding to a time during which the resin workpiece is spread to fill the cavity; comparing the detected value with a predetermined optimum value when the moving mold passes the predetermined position, to determine a deviation; deciding the quality of the resin workpiece on the basis of the deviation; and interrupting the compression-molding operation when it is decided that the quality of the resin workpiece is nonconforming or executing a control operation to add a predetermined correction corresponding to the deviation to the press characteristic when it is decided that the quality of the resin workpiece is conforming.

In a seventh aspect of the present invention, a method of controlling hydraulic pressure applied to the hydraulic cylinder actuators of a compression-molding press in compression-molding a resin workpiece on the compression= molding press which compression-molds the resin workpiece in a cavity formed between a pair of molds by moving at least one of the pair of molds by the hydraulic cylinder actuators comprises steps of: detecting a molding pressure $P_O'$ in the cavity when the moving mold passes a predetermined position; comparing the detected molding pressure $P_O'$ with a predetermined /ptimum molding pressure $P_N'$, to determine the deviation $\Delta P_O' = P_N' - P_O'$; deciding the quality of the resin workpiece on the basis of the deviation $\Delta P_O'$; and interrupting the compression-molding operation when it is decided that the quality of the resin workpiece is nonconforming or executing a pressure control operation to add a predetermined pressure correction $\Delta P$ corresponding to the deviation $\Delta P_O'$ to the hydraulic pressure $P_O'$ when it is decided that the quality of the resin workpiece is conforming.

In an eighth aspect of the present invention, a method of controlling hydraulic pressure applied to the hydraulic cylinder actuators of a compression-molding press in compression-molding a resin workpiece on the compression-molding press which compression-molds the resin workpiece in a cavity formed between a pair of molds by moving at least one of the pair of molds by the hydraulic cylinder actuators comprises steps of: detecting the moving speed $V_O$ of the moving mold when the moving mold passes a predetermined position; comparing the detected moving speed $V_O$ with a predetermined optimum moving speed $V_N$ to determine the deviation $\Delta V_O = V_N - V_O$; deciding the quality of the resin workpiece on the basis of the deviation $\Delta V_O$; and interrupting the compression-molding operation when it is decided that the quality of the resin workpiece is nonconforming or executing a pressure control operation to add a predetermined pressure correction $\Delta P$ corresponding to the deviation $\Delta V_O$ to the hydraulic pressure acting on the hydraulic cylinder actuator when it is decided that the quality of the resin workpiece is conforming.

In a ninth aspect of the present invention, in the method in the eighth aspect of the present invention, the thickness of the resin workpiece is reduced to half the initial thickness thereof or below when the moving mold is at the predetermined position.

The method of deciding the quality of the resin workpiece in accordance with the present invention compares the actual value of hydraulic pressure applied to the hydraulic cylinder actuator, the pressure in the cavity, moving speed of the moving mold or the time between the time when the moving mold passes the first position and the time when the moving mold passes the second position with the predetermined values of the same, and decides that the resin workpiece is nonconforming when the deviation is greater than a reference value or that the resin workpiece is conforming when the deviation is smaller than the reference value.

The method of controlling hydraulic pressure applied to the hydraulic cylinder actuator of a compression-molding press in accordance with the present invention corrects the hydraulic pressure applied to the hydraulic cylinder actuator with reference to the deviation so that the hydraulic pressure approaches an appropriate hydraulic pressure when it is decided that the resin workpiece is conforming.

Since the compression-molding process is interrupted when the resin workpiece is nonconforming, the production of a large number of defective moldings can be prevented. The present invention corrects the hydraulic pressure applied to the hydraulic cylinder actuator automatically for optimal compression-molding operation.

BRIEF DESCRIPTION OF THE DRAWINGS

The above and other objects, features and advantages of the present invention will become more apparent from the following description taken in connection with the accompanying drawings, in which:

FIG. 2 is a diagram of assistance in explaining the compression-molding operation of the compression-molding press of FIG. 1 in carrying out the present invention.

DETAILED DESCRIPTION OF THE PREFERRED EMBODIMENTS

Figure 1:
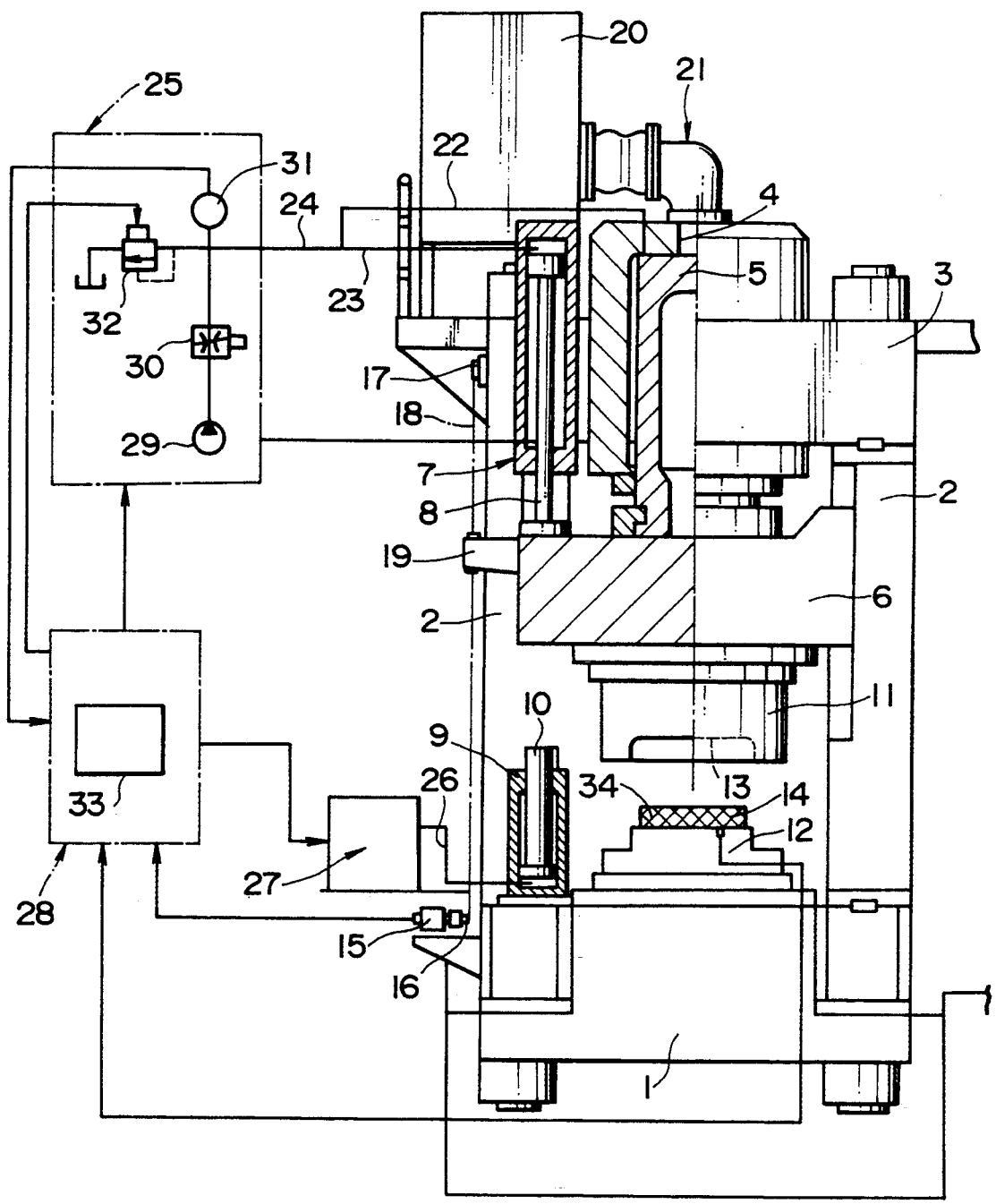
FIG. 1 is a partially sectional front view of a compression-molding press for carrying out the present invention.

Referring to FIG. 1, a compression-molding press for compression-molding a SMC workpiece comprises a bed 1 fixedly installed on the floor, four uprights 2 set upright in the four corners of the bed 1, and a crown 3 fixedly connected to the upper ends of the four uprights 2. A single-acting main cylinder actuator 4 is mounted on the crown 3 in the central portion of the crown 3. The main cylinder actuator 4 has a piston rod 5 projecting downward from the crown 3. A slide 6 connected to the lower end of the piston rod 5 is guided for vertical sliding movement by the four uprights 2. Double-acting auxiliary cylinder actuators 7 are supported on the right and left sides of the crown 3, respectively. The auxiliary cylinder actuators 7 have piston rods 8 connected to the slide 6.

A leveling cylinder actuator 9 is disposed in each corner of the bed 1. The leveling cylinder actuators 9 have piston rods 10 having upper ends capable of being brought into contact with the lower surface of the slide 6. An upper half mold 11 is attached detachably to the lower surface of the slide 6, and a lower half mold 12 is attached detachably to the upper surface of the bed 1. When the upper half mold 11 and the lower half mold 12 are clamped together, a cavity 13 is formed therebetween. The lower half mold 12 is provided with a built-in molding pressure sensor 14 for detecting the pressure in the cavity 13. A rotary encoder 15 is attached to one side surface of the bed 1, a sprocket 16 is mounted on the input shaft of the rotary encoder 15, a sprocket 17 is supported on the side surface of the crown 3 and a chain 18 is extended between the sprockets 16 and 17. The chain 18 has opposite ends attached to a sprocket 19 attached to the slide 6. The position of the slide 6 holding the upper half mold 11, the moving speed of the slide and a time in which the slide 6 travels from a predetermined position to another predetermined position are detected by the rotary encoder 15.

A hydraulic fluid tank 20 is mounted on the crown 3 and connected through a valve 21 to the main hydraulic cylinder actuator 4. The main hydraulic cylinder actuator 4 and the auxiliary hydraulic cylinder actuators 7 are connected respectively by pipes 22, 23 and 24 to a first hydraulic power unit 25. The leveling hydraulic cylinder actuators 9 are connected by a pipe to a second hydraulic power unit 27. The first hydraulic power unit 25, the second hydraulic power unit 27, the molding pressure sensor 14 and the rotary encoder 15 are connected electrically to a controller 28. The first hydraulic power unit 25 includes a hydraulic pump 29, a flow control valve 30, a pressure sensor 31 and a pressure control valve 32. The controller 28 is provided with a computer 33. In FIG. 1, indicated at 34 is a SMC workpiece put on the lower half mold 12.

The operation of the compression-molding press will be described hereinafter with reference to FIG. 2, in which time is measured to the right on the horizontal axis, and the position of the slide 6, the pressure in the cavity 13, hydraulic pressures applied respectively to the main hydraulic cylinder actuator 4 and the auxiliary hydraulic cylinder actuators 7 are measured upward on the vertical axis and curves represent optimum variation of the foregoing parameters with time.

Referring to FIG. 2, in step 1, the slide 6 is positioned at its top dead center and a SMC workpiece 34 is put on the lower half mold 12. In step 2, the hydraulic fluid is supplied to the main hydraulic cylinder actuator 4 and the auxiliary hydraulic cylinder actuators 7 by the hydraulic pump 29 to move the slide 6 downward at a high speed. The speed of the slide 6 is controlled by regulating the flow rate of the hydraulic fluid by the flow control valve 30. The pressure of the hydraulic fluid is controlled by the pressure control valve 32.

In step 3, the slide 6 is decelerated. The deceleration of the slide 6 is started upon the detection of arrival of the slide 6 at a predetermined position by the rotary encoder 15. Step 4 is started upon the detection of arrival of the slide 6 at a predetermined position where the lower surface of the slide 6 comes into contact with the upper ends of the piston rods 10 of the leveling hydraulic cylinder actuators 9. In step 4, the operating speed of the hydraulic cylinder actuators 4 and 7, and the leveling operation of the leveling hydraulic cylinder actuators 9 are controlled simultaneously. As the slide 6 is lowered further, the piston rods 10 of the leveling hydraulic cylinder actuators 9 are depressed. The leveling hydraulic cylinder actuators 9 are controlled so that the upper ends /f the piston rods 10 are on the same level to maintain the slide 6 accurately in a horizontal position. In step 4, the lowering speed of the slide 6 is decreased stepwise. At the end of step 4, the upper half mold 11 and the lower half mold 12 are clamped completely and the SMC workpiece 34 fills up the cavity 13.

Then, in step 5, pressure control operation is started to control the hydraulic pressure applied to the hydraulic cylinder actuators 4 and 7 by the pressure control valve 32. In step 6, leveling control operation is executed in parallel to the pressure control operation to compression-mold the SMC workpiece 34 in a desired shape in the cavity 13. In step 7, an in-mold coating process is carried out, in which the pressure in the cavity 13 is reduced, the slide 6 is raised slightly and a coating of a predetermined thickness is formed over the surface of the SMC workpiece 34 in the cavity 13. In step 8, the slide 6 is lowered again and the hydraulic pressure applied to the hydraulic cylinder actuators 4 and 7 are controlled stepwise to compress the coated SMC workpiece 34 again. In step 9, the slide 6 is raised to its starting position to open the mold. Thus, a compression-molding cycle comprising steps 1 to 9 is completed.

A method of deciding the quality of a resin work is carried out to decide the quality of the SMC workpiece 34 before step 6 to decide on the basis of the quality of the SMC workpiece 34 whether the following steps of the compression-molding process are to be executed or whether the compression-molding operation must be interrupted.

A method of deciding the quality of a resin work in a first embodiment according to the present invention detects a press characteristic indicative of workpiece quality, e.g., the pressure $P_O$ of the hydraulic fluid supplied to the hydraulic cylinder actuators 4 and 9 by the pressure sensor 31 upon the arrival of the slide 6 at a predetermined position in step 5. Then, the computer 33 of the controller 28 compares the detected pressure $P_O$ with a predetermined standard pressure $P_N$, i.e., an optimum pressure determined previously for satisfactory compression-molding, and decides the quality of the SMC workpiece 34 on the basis of the result of comparison.

When compression-molding the SMC workpiece 34 on the compression molding press, the slide 6 operates as shown in FIG. 2 and the application of pressure to the SMC workpiece 34 is started in step 4. The pressure control valve 32 controls the pressure exerted on the SMC workpiece 34 to compress the SMC workpiece 34 in the cavity 13. As the slide 6 is lowered gradually, the SMC workpiece 34 is spread in the cavity 13 to fill up the cavity 13, and after the cavity 13 has been filled up with the SMC workpiece 34, the pressure in the cavity 13 increases and the pressure in the cavity 13 acts against the downward movement of the slide 6.

The quality of the SMC workpiece 34 is dependent on the respective quantities of the additives contained therein and the viscosity of the SMC workpiece 34 varies with time after the manufacture of the SMC workpiece 34. Therefore, the quality of the SMC workpiece 34 differs with each lot and hence the mode of flow of the SMC workpiece 34 in the cavity 13 differs with each lot. Thus, the resistance of the SMC workpiece 34 against compression is dependent on the quality of the same. If the resistance of the SMC workpiece 34 is excessively large, the slide 6 is unable to be lowered at a predetermined lowering speed and the resin of the SMC workpiece 34 will harden before the SMC workpiece 34 is compressed perfectly, whereby chips will be formed in the molding to make the molding defective. If the viscosity of the SMC workpiece 34 is excessively high, the resistance of the SMC workpiece against the pressure of the slide 6 exceeds a predetermined value; that is, a hydraulic pressure greater than a predetermined hydraulic pressure must be applied to the hydraulic cylinder actuators 4 and 7. Thus, the quality of the SMC workpiece 34 can be decided on the basis of the hydraulic pressure applied to the hydraulic cylinder actuators 4 and 7. The pressure sensor 31 detects a hydraulic pressure $P_O$ acting on the hydraulic cylinder actuators 4 and 7 when the slide 6 is at a predetermined position $H_O$ and gives a signal representing the hydraulic pressure $P_O$ to the computer 33 of the controller 28. Then, the computer 33 compares the detected hydraulic pressure $P_0$ with a predetermined optimum hydraulic pressure $P_N$ to determine the deviation $\Delta P_O = P_N - P_O$. Then, the computer 33 compares the deviation $\Delta P_O$ with an allowable deviation $\Delta P_N$ stored beforehand therein. The computer 33 decides that the SMC workpiece 34 is nonconforming if $|\Delta P_O| \geq \Delta P_N$ or decides that the SMC workpiece 34 is conforming if $|\Delta P_O| < \Delta P_N$. The value of $P_N$ is determined specifically for the SMC workpiece and, generally, $\Delta P_N = 0.1 \times P_N$. For SMC workpieces having a large thickener content, $\Delta P_N \approx 0.15 \times P_N$ is applicable. For SMC workpieces having high fluidity or having a small thickener content, it is preferable to apply $\Delta P_N \approx 0.05 \times P_N$ to the decision of the quality.

Although the resistance of the SMC workpiece against the pressure of the slide 6 is affected by the size, i.e., thickness, length and width, of the SMC workpiece, the size of the SMC workpiece need not be taken into consideration because the SMC workpiece, in general, is supplied in a standard size. Thus, the method is able to detect the abnormal size of the SMC workpiece as well as the properties of the same.

The compression-molding operation is continued when it is decided that the SMC workpiece 34 is conforming, or the compression-molding operation is interrupted when it is decided that the SMC workpiece 34 is nonconforming.

It is possible that a defective molding is produced even if a decision that the quality of the SMC workpiece 34 is conforming is made, when the deviation $\Delta P_O$ is relatively large. Accordingly, the present invention controls the working hydraulic pressure to correct the molding conditions automatically. When $|\Delta P_O| \leq \Delta P_N$ and it is decided that the SMC workpiece 34 is conforming, the present invention changes a set pressure for which the pressure control valve 32 is set, by using a pressure correction $\Delta P$ corresponding to the deviation $\Delta P_O$ for the next compression-molding cycle.

If the optimum hydraulic pressure is $P_{N1}$ in one compression-molding cycle, the pressure control valve 32 is set for $P_{N1} \pm \Delta P$ for the next compression-molding cycle. The sign of $\Delta P$ is dependent on the sign of $\Delta P_O$. Thus, the lowering speed of the slide 6 is controlled properly and hence the SMC workpiece 34 is caused to flow uniformly within the cavity 13 regardless of change in the properties of the SMC workpiece 34.

A method of deciding the quality of the resin workpiece in a second embodiment according to the present invention decides the quality of the resin workpiece on the basis of pressure acting on the resin workpiece in the cavity 13.

The molding pressure sensor 14 detects a molding pressure $P_O'$ acting on the SMC workpiece 34 in the cavity 13 upon the arrival of the slide 6 at the predetermined position $H_O$ and gives a signal representing the molding pressure $P_O'$ to the computer 33. Then, the computer 33 compares the detected molding pressure $P_O'$ with a predetermined optimum molding pressure $P_N'$ and determines the deviation $\Delta P_O' = P_N' - P_O'$. The computer 33 decides that the quality of the SMC workpiece 34 is nonconforming If $|\Delta P_O'| \geq \Delta P_N'$, where $\Delta P_N'$ is a predetermined allowable deviation, or that the quality of the SMC workpiece 34 is conforming if $|\Delta P_O'| < \Delta P_N'$. When $|\Delta P_O'| < \Delta P_N'$, the computer 33 changes a set pressure for which the pressure control valve 32 is set, by a pressure correction $\Delta P'$ corresponding to the deviation $\Delta P_O'$ for the next compression-molding cycle. If the optimum hydraulic pressure is $P_{N1}$ in one compression-molding cycle, the pressure control valve 32 is set for $P_{N1} \pm \Delta P$ for the next compression-molding cycle. The sign of $\Delta P$ is dependent on the sign of $\Delta P_O'$.

A method of deciding the quality of a resin workpiece in a third embodiment according to the present invention decides the quality of the resin workpiece on the basis of the moving speed of the slide 6.

The rotary encoder 15 detects the moving speed $V_O$ of the slide 6 when the slide 6 passes a predetermined position $H_O$ and gives a signal representing the moving speed $V_O$ to the computer 33 of the controller 28. Then, the computer 33 compares the detected moving speed $V_O$ with a predetermined moving speed $V_N$ stored beforehand therein to determine the deviation $\Delta V_O = V_N - V_O$, and then compares the deviation $\Delta V_O$ with a predetermined allowable deviation $\Delta V_N$. The computer decides that the quality of the SMC workpiece 34 is nonconforming if $|\Delta V_O| \Delta V_N$.

Experiments showed that the optimum predetermined position $H_O$ is a position of the slide 6 where the thickness of the SMC workpiece 34 is reduce to half the initial thickness thereof or below.

After it is decided that the quality of the SMC workpiece 34 is conforming, i.e., if $|\Delta V_O| < \Delta V_N$, the hydraulic pressure for which the pressure control valve 32 is set is corrected by using a pressure correction $\Delta P''$ according to the deviation $\Delta V_O$. If the optimum hydraulic pressure is $P_{N1}$ in one compression-molding cycle, the pressure control valve 32 is set for $P_{N1} \pm \Delta P''$ for the next compression-molding cycle. The sign of $\Delta P''$ is dependent on the sign of the deviation $\Delta V_O$. Thus, the lowering speed of the slide 6 is controlled properly so that the SMC workpiece 34 is caused to fill the cavity 13 uniformly regardless change in the quality of the SMC workpiece 34.

A method of deciding the quality of a resin workpiece in a fourth embodiment according to the present invention decides the quality of the resin workpiece on the basis of a time between the time when the slide 6 passes a predetermined first position and the time when the slide 6 passes a predetermined second position spaced from the first position by a predetermined distance.

The rotary encoder 15 detects a time $T_O$ between the time when the slide 6 passes the first position and the time when the slide 6 passes the second position in compression-molding the SMC workpiece 34 and gives a signal representing the time $T_O$ to the computer 33 of the controller 28. Then, the computer 33 compares the detected time $T_O$ with a predetermined optimum time $T_N$ stored beforehand therein to determine the deviation $\Delta T_O = T_N - T_O$ and compares the deviation. $\Delta T_O$ with a predetermined allowable deviation $\Delta T_N$. The computer 33 decides that the quality of the SMC workpiece is nonconforming if $|\Delta T_O| \geq \Delta T_N$ or that the quality of the SMC workpiece 34 is conforming if $|\Delta T_O| < \Delta T_N$.

Although the present invention has been described as applied to deciding the quality of the SMC workpiece in compression-molding the latter, the present invention is applicable also to methods of deciding the quality of resin workpieces other than the SMC workpiece, such as workpieces of a stampable sheet.

Although the present invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method for deciding the quality of a resin workpiece in compression-molding the resin workpiece on a compression-molding press which compression-molds the resin workpiece in a cavity formed between a pair of molds by moving at least one of the pair of molds by hydraulic cylinder actuators, said method comprising the steps of:
    moving said at least one of said pair of molds such that the resin workpiece in the cavity is spread and fills up the cavity;
    detecting a value of a press characteristic indicative of workpiece quality upon the arrival of the moving mold at a position, said position corresponding to a time during which the resin workpiece is spread to fill up the cavity;
    comparing the detected value with a predetermined optimum value of the press characteristic when the moving mold is at the position to determine a deviation between said detected value and said optimum value; and
    deciding the quality of the resin workpieces on the basis of the deviation.

2. The method of claim 1, wherein said characteristic comprises a hydraulic pressure of the working fluid supplied to the hydraulic cylinder actuators.

3. The method of claim 1, wherein said characteristic comprises a molding pressure in the cavity.

4. The method of claim 1, wherein said characteristic comprises a moving speed of the moving mold.

5. The method of claim 1, wherein said characteristic comprises the time necessary for said moving mold to move a predetermined distance from said position.

6. A method of deciding the quality of a resin workpiece according to claim 4, wherein the thickness of the resin workpiece is reduced to half the initial thickness thereof or below when the moving mold is at said position.

7. A method of controlling a compression-molding press in compression-molding a resin workpiece on the compression-molding press which compression-molds the resin workpiece in a cavity formed between a pair of molds by moving at least one of the pair of molds by the hydraulic cylinder actuators, said method comprising the steps of:
    moving said at least one of said pair of molds such that the resin workpiece in the cavity is spread and fills up the cavity;
    detecting a value of a press characteristic indicative of workpiece quality when the moving mold passes a predetermined position, said position corresponding to a time during which the resin workpiece is spread to fill up the cavity;
    comparing the detected value with a predetermined optimum value of the press characteristic when the moving mold passes the position, to determine a deviation between said detected value and said optimum value;
    deciding the quality of the resin workpiece on the basis of the deviation; and
    performing one of a step of interrupting the compression-molding operation when it is decided that the quality of the resin workpiece is nonconforming and a step of executing a control operation to add a predetermined correction corresponding to the deviation to the press characteristic when it is decided that the quality of the resin workpiece is conforming.

8. The method of claim 7, wherein said characteristic comprises a hydraulic pressure of the working fluid supplied to the hydraulic cylinder actuators.

9. The method of claim 7, wherein said characteristic comprises a molding pressure in the cavity.

10. The method of claim 7, wherein said characteristic comprises a moving speed of the moving mold.

11. A method according to claim 10, wherein the thickness of the resin workpiece is reduced to half the initial thickness thereof or below when the moving die is at said predetermined position.

* * * * *